United States Patent [19]
Lahcanski et al.

[11] Patent Number: 5,418,597
[45] Date of Patent: May 23, 1995

[54] CLAMPING ARRANGEMENT FOR FILM SCANNING APPARATUS

[75] Inventors: Tomi Lahcanski, Rochester; Eric P. Hochreiter, Bergen; James M. Thomas, Macedon; D. Mathew Dobbins, Rochester, all of N.Y.

[73] Assignee: Eastman Kodak Company, Rochester, N.Y.

[21] Appl. No.: 943,423

[22] Filed: Sep. 14, 1992

[51] Int. Cl.6 .............................................. G03B 27/62
[52] U.S. Cl. ..................................................... 355/76
[58] Field of Search ...................... 355/47, 48, 50, 75, 355/76, 104, 108, 109, 111; 352/228, 229, 230; 353/95; 242/55, 71, 76; 226/76, 83, 84, 85

[56] References Cited

U.S. PATENT DOCUMENTS 3,473,874 10/1969 Hall et al. .............................. 355/52
4,774,553 9/1988 Blanding et al. ....................... 355/75
4,965,632 10/1990 Jadrich et al. ......................... 355/76

Primary Examiner—Michael L. Gellner
Assistant Examiner—D. P. Malley
Attorney, Agent, or Firm—Edward Dugas

[57] ABSTRACT

A clamping arrangement essentially comprising two lever arms driven at one end by a solenoid and having a resilient clamp pad mounted on a flexure member at the other end thereof. The clamp pad is made of a resilient material such as, for example, urethane and has four non-parallel side walls defining an upper face which is complementary to the radial face of the scanning apparatus gate. The sloping side walls of the clamp pad act as a light baffle to prevent reflected light from entering the imaging lens, and the pad is gimballed so that any variations between the upper surface of the clamp pad and the radial surface of the gate will be eliminated attain as perfect a match therebetween as is possible. In another embodiment of the clamping arrangement, a single arm can be utilized in place of the dual arm arrangement described above. The single arm has a Y-shape in which the clamp pad is supported on the branched end of the arm and the solenoid drives the single member. An additional clamp pad can be provided for clamping laminated paper attached to the film for a reprocessing order after the film itself has been clamped by the first-mentioned clamp pad against the gate in the area of the aperture.

20 Claims, 19 Drawing Sheets

CLAMPING ARRANGEMENT FOR FILM SCANNING APPARATUS

FIELD OF THE INVENTION

The present invention relates to a clamping arrangement for a scanning apparatus and, more particularly, to a clamping apparatus used in connection with an arcuate-segment-shaped gate in a scanning apparatus used, for example, by photographic labs for digitizing images contained on photographic film onto a compact disc (CD) format.

BACKGROUND ART

Several types of scanning apparatus for scanning negative still and motion picture films are known and currently used by photographic labs. Eastman Kodak Company now offers a PIW 2200 system which uses a Kodak 2000 scanner having a flat gate for handling film strips and slides to digitize an excellent high resolution image for storage on a compact disc. This scanner cannot handle continuous rolls of film as would be desirable for large numbers of orders. Another type of scanner uses a drum for scanning motion picture film. Other types of drum scanners are known for scanning continuous rolls of film or single negative, although no drum scanner does both. In addition, screw-driven flat bed scanners are known. All of the known scanners have, however, limitations in terms of their versatility in that they are not capable of providing a high resolution scan while, at the same time, avoiding the need for interchangeability for handling first order and reorders for photographic processing labs.

It has been found that the method for clamping the film relative to the gate in the conventional apparatus does not provide a true flattening of the film to obtain a better image so that scanning can take place with the greatest accuracy and resolution. In one known clamping systems used in a conventional flat-gate scanning apparatus of the aforementioned type, two berrylium copper spring arms are actuated by a solenoid to clamp the film against a flat gate through which scanning takes place. The spring fingers of the spring arms attempt to spread and stretch the film flat, but this arrangement does not obtain as flat a film as desired, particularly since the clamping takes place only on the sprockets. This clamping system does not, therefore, result in the maximum film control needed to obtain as flat a plane as possible. Consequently, the known clamping arrangement is insufficient to provide a constant location for scanning and does not adequately take into account tolerance variations.

Whereas it was generally known in the photographic film art that a curve could be used to maintain a desired flatness in films, it was not known prior to the present invention that curved gate could be used to maintain flatness in the film and also to handle several film transport formats for a scanning operation. The clamping of the edges of individual strips around the entire periphery prevent the edges from flattening out so as to distort the film and degrade the image to be digitized. In other words, the present invention allows reels of film to be used with or without laminate and the radial gate makes the film flatter for achieving a better image while avoiding stretching the film which would otherwise straighten across the arcuate aperture. This arrangement thus provides a constant scanning location for precise digitizing of the image within the capability of the digitizing equipment itself.

DISCLOSURE OF THE INVENTION

It is an object of the present invention to provide a clamping arrangement which cooperates with a six-inch radius gate approximately having the shape of an arc segment of a circle to obtain a constant scanning location for the film without slippage and/or and to maintain the film in the plane of the face of the gate under virtually all circumstances regardless of manufacturing tolerances and misalignments.

This object has been achieved in accordance with one embodiment of the present invention by providing a clamping arrangement essentially comprising two lever arms driven at one end by a solenoid and having a resilient clamp pad mounted on a flexure member at the other end thereof. The clamp pad is made of a resilient material such as, for example, urethane and has four non-parallel side walls defining an upper face which is complementary to the radial face of the scanning apparatus gate. The sloping side walls of the clamp pad act as a light baffle to prevent reflected light from entering the imaging lens, and the pad is gimballed so that any variations between the upper surface of the clamp pad and the radial surface of the gate will be eliminated attain as perfect a match therebetween as is possible.

According to another embodiment of the clamping arrangement of the present invention, a single arm can be utilized in place of the dual arm arrangement described above. The single arm has a Y-shape in which the clamp pad is supported on the branched end of the arm and the solenoid drives the single member.

According to yet another embodiment of the present invention, an additional clamp pad can be provided for clamping laminated paper attached to the film for a reprocessing order after the film itself has been clamped by the first-mentioned clamp pad against the gate in the area of the aperture. This arrangement provides the additional advantage of allowing greater flexibility for the scanning apparatus by being able to use laminates, including the Kodak laminate system as well as of the "URS" system which is also well known in the photographic film lab industry. The additional clamp is arranged such that there is no relative motion between the film and the paper so as to avoid any mismatch between the tension in the film and the tension in the paper. If there is some difference between the two tensions, the additional clamp avoids the film being ripped off the paper.

Yet another aspect of the present invention involves the use of a shaft actuator which prevents side loads on the solenoid as the double arm or single arm of the clamping arrangement pivots into its clamping position.

BRIEF DESCRIPTION OF THE DRAWINGS

These and further objects, features and advantages of the present invention will become more apparent from the following detailed description of currently contemplated embodiments when taken in conjunction with the accompanying drawings wherein:

FIG. 14 is a view similar to FIG. 13 but with the additional clamp pad present for also clamping laminate on the edge of the film having punched perforations in accordance with the Kodak standard, the URS standard and the like;

MODES FOR CARRYING OUT THE INVENTION

Figure 1:
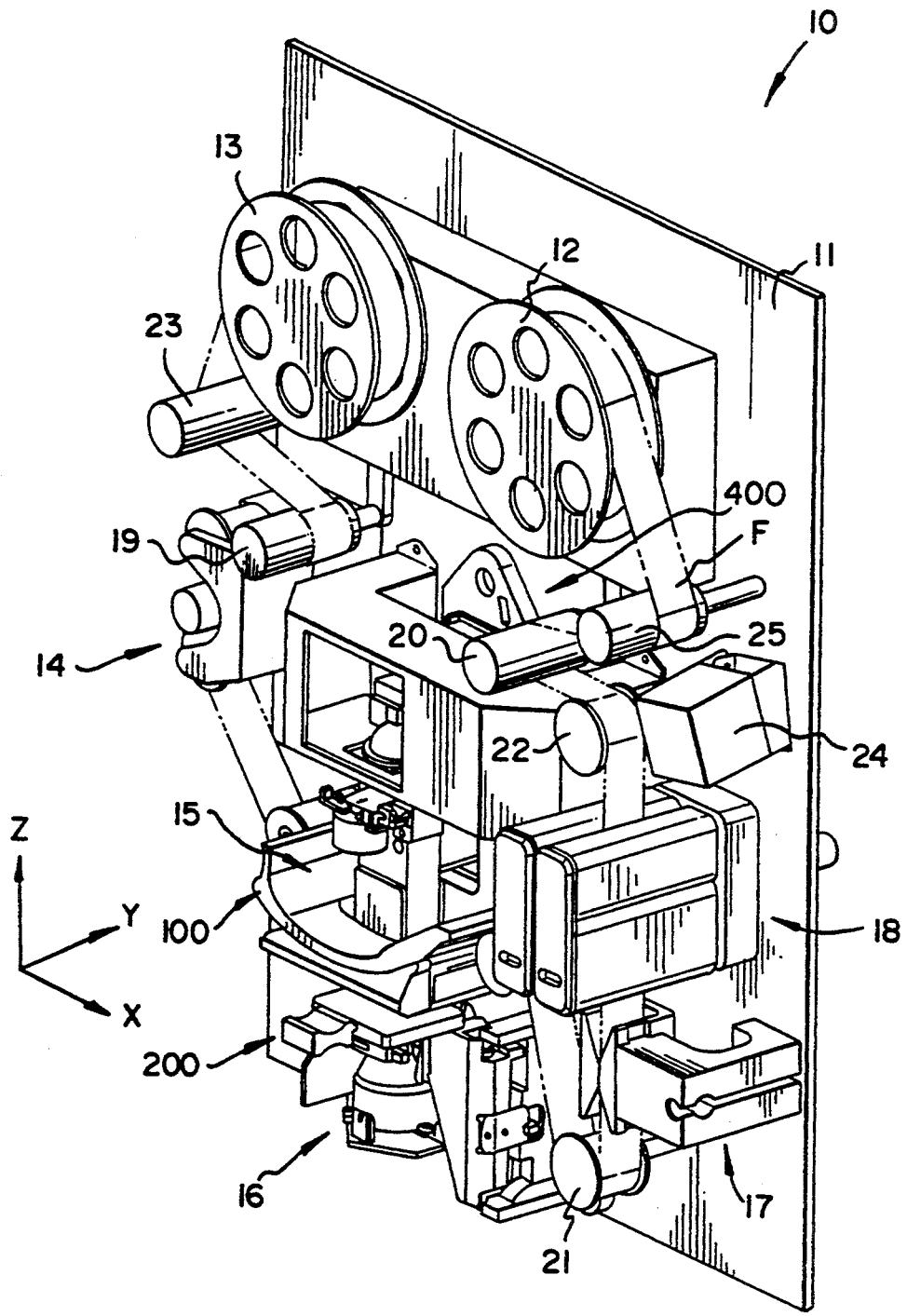
FIG. 1 is a perspective view of the major components of the scanning apparatus, which components are mounted on a cabinet board or frame, utilizing the clamping arrangement of the present invention.
Figure 2:
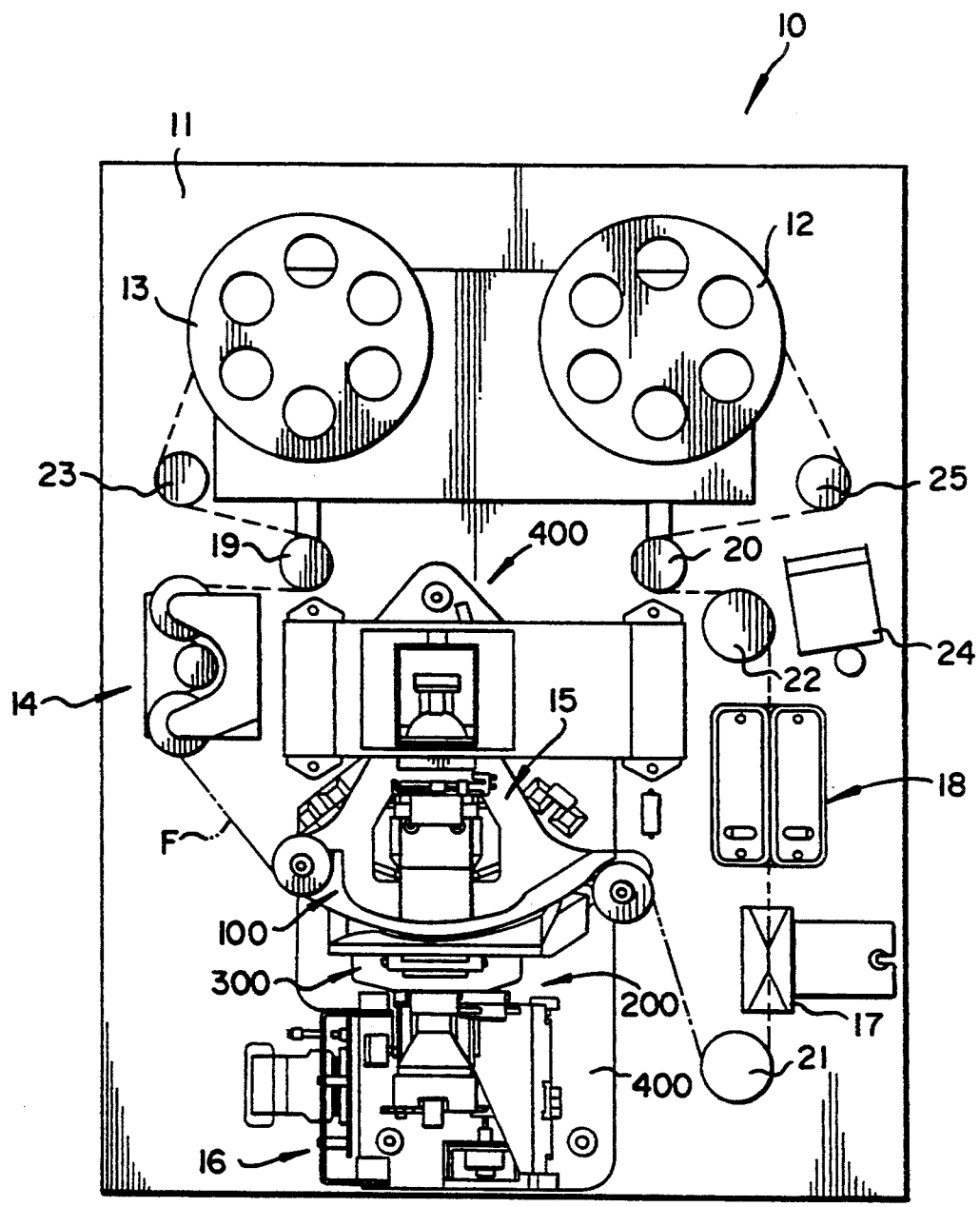
FIG. 2 is a front elevational view of the component assembly shown in FIG. 1.
Figure 3:
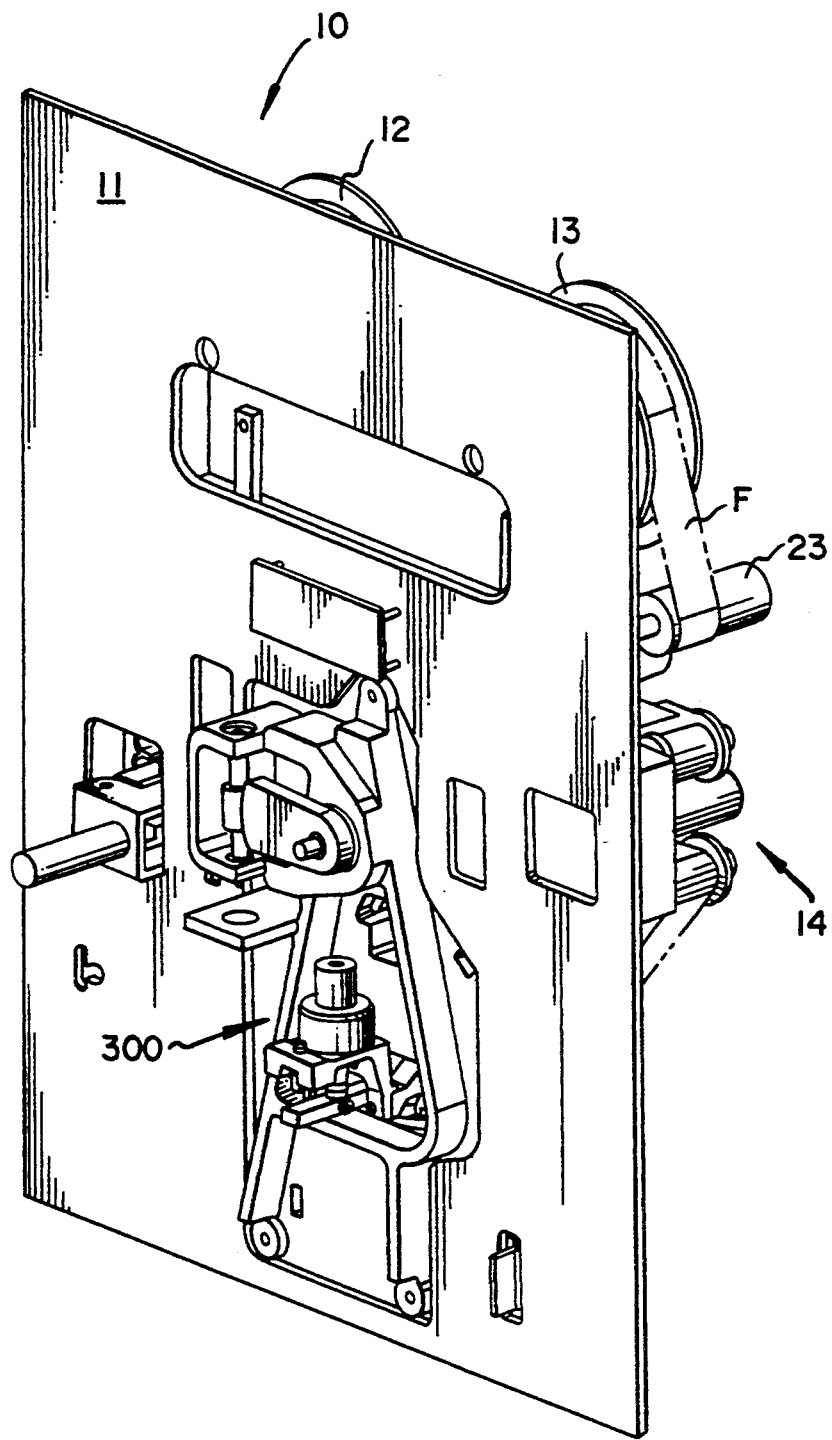
FIG. 3 is a perspective view similar to FIG. 1 but showing the reverse side of the board carrying the components.
Figure 4:
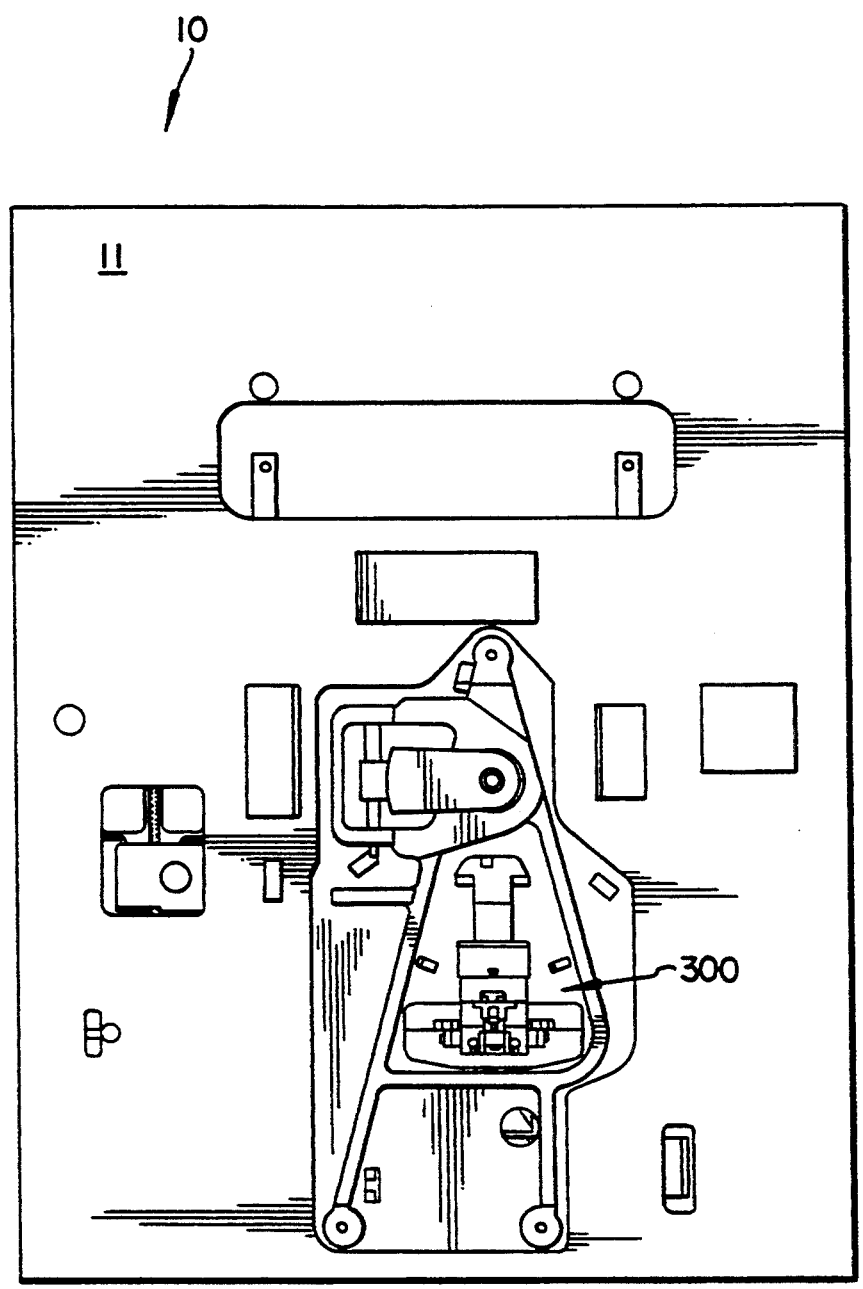
FIG. 4 is a rear elevational view of the reverse side shown in FIG. 3.
Figure 5:
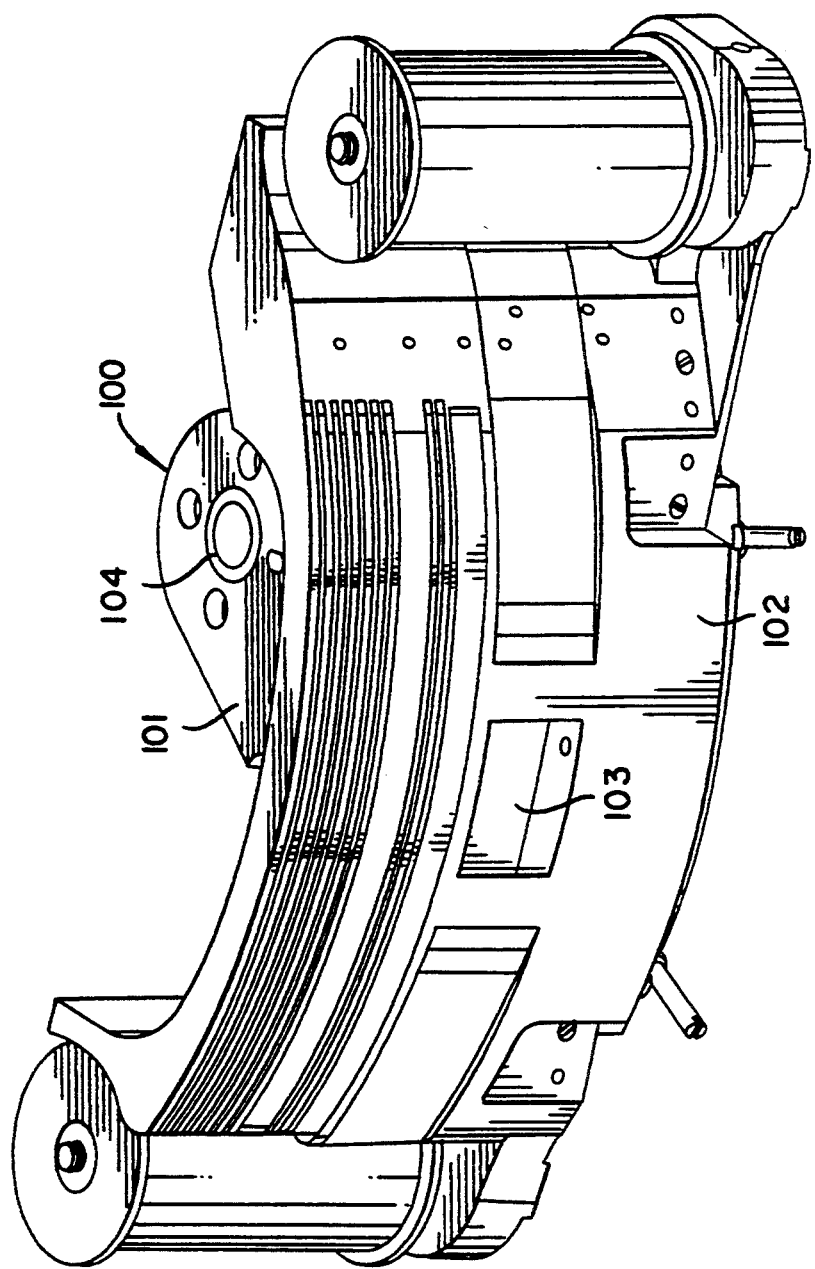
FIG. 5 is a perspective view of the arc-segment-shaped gate and its aperture used in the scanning apparatus shown in FIGS. 1-4 and against which the clamping arrangement of the present invention clamps the film.

Referring now to the drawings and, in particular, to FIGS. 1 to 4, a photographic negative film scanning apparatus for scanning and digitizing images on frames of the film is designated generally by the numeral 10. The apparatus 10 includes a board 11 on which are mounted conventional film transport reels 12, 13, a capstan drive 14, an integrating cavity 15, a conventional imager with imaging board designated generally by the numeral 16, a DX bar code reader 17 for determining the type of film being processed, a film cleaning apparatus 18, a bar code reader 24 for reading order processing data, and spring-biased tension rollers 19, 20 to maintain the film at a substantially constant tension during the high resolution scanning pass. In addition, other idler rollers 21, 22, 23 and 25 are mounted on the board 11 to maintain a smooth but tight path for the film F shown in long and short dash lines. A gate 100, seen in more detail in FIG. 5, is rotated, during the high resolution scanning pass in an arc of about 6⅛° on both sides of a vertical axis constituting an initializing position in which the gate assumes during the low resolution operation. The film F which is supplied from reel 12 shown in FIGS. 1 and 2 is advanced by the capstan mechanism 14 by pulling the film F from the supply reel 12 over the gate 100 and onto the take-up reel 13. It will be understood, of course, that the capstan mechanism 14 can be disposed on the right-hand side of the scanning apparatus to push the film F over the gate 100 without departing from the scope of the present invention.

A lens protector device 200 is provided in close proximity to the LCM optical scanning mechanism to protect its lens from dust and the like as more fully described in co-pending application Ser. No. 943,424 entitled LENS PROTECTOR DEVICE filed in the names of Tomi Lahcanski, et al. on Sep. 14, 1992. Inasmuch as the details of the lens protecting device 200 are not necessary for an understanding of the present invention, further details with respect thereto are dispensed with and the contents of said application are incorporated by reference herein for background as to the overall construction of the scanning apparatus.

Referring to FIG. 5, in its current embodiment, the gate 100, from a side view is approximately L-shaped having a vertical wall 101 shaped somewhat like a triangle and an arcuate lower portion 102 whose surface in the vicinity of an aperture 103 through which line-by-line scanning of the film F (shown in FIGS. 1, 2 and 3) is to take place has a six inch radius as measured from the axis of rotation provided by a spherical joint 104 of the apex of the wall 101 of the gate 100 for producing a pendulum-like motion of the gate 100.

In a typical operation of the scanning device 10 by a photographic lab, the film in which notches have been made along the edge for locating scannable images, with or without a paper laminate having punched apertures is loaded on a supply reel 12 with a sufficient leader of defined length to thread over the stationary idler roller 25, the spring-biased tension roller 20, the stationary idler roller 22 adjacent the bar code reader 24, through the film cleaning unit 18, the DX bar code reader 17, then over the gate 100, through the capstan mechanism 14, over the spring-biased tension roller 19, over the stationary idler 23 and onto the take-up reel 13. The apparatus 10 is then run through a prescanning or "low resolution" pass in which the gate 100 is held in its central or initializing position shown in FIG. 2. After the data on the film itself and/or on a Kodak standard, URS standard and the like laminate paper strip attached to the film F has been prescanned, the film F is rewound onto the supply reel 12.

After rewinding is complete, the apparatus 10 is now ready for the "high resolution" scanning operation in which the images contained on selected frames of the film can be scanned and digitized with sufficient resolution in a known manner by the light from the integrating cavity 15 and the LCM imaging unit 16 performing a line-by-line scan across the film through the aperture 103 of the gate. Typically, at the start of the high resolution pass the gate 100 is moved from its initializing position shown in FIG. 2 to a "home" position on the right hand side by being rotated counterclockwise through an arc of about 6½°. In this location, the film F will be scanned in about 4 seconds line-by-line from the left-hand edge of the aperture 103 as seen in FIG. 5 with the scanning proceeding line-by-line toward the right edge of the aperture during which a solenoid-actuated clamping mechanism designated generally by numeral 300 in FIGS. 2–4, which is the subject of the present invention and herein after described in detail below, clamps the film frame against the aperture. The capstan mechanism 14 advances the film F, as determined by notches in the edge of the film (FIG. 13) for first orders and by punched apertures in the paper laminate (FIG. 14) for reorders such that the desired film frame is located in the exact area of the aperture 103 of the gate 100 where the scanning is to be accomplished. The clamp mechanism 300 is then moved upwardly to the solid line position from the short-dashed line position shown in FIG. 12. The capstan mechanism 14 then disengages, and a motor (not shown) starts the gate 100 moving from the right hand side toward the vertical position and up towards the left hand side until the gate is in its left most position after having traversed another arc of about 6½° as measured from the vertical initializing position shown in FIG. 2. During this movement of the film F, line-by-line scanning of the frame over the aperture is scanned to digitize the image thereon while the web tension is maintained by the tensioning arms 19, 20.

Figure 6:
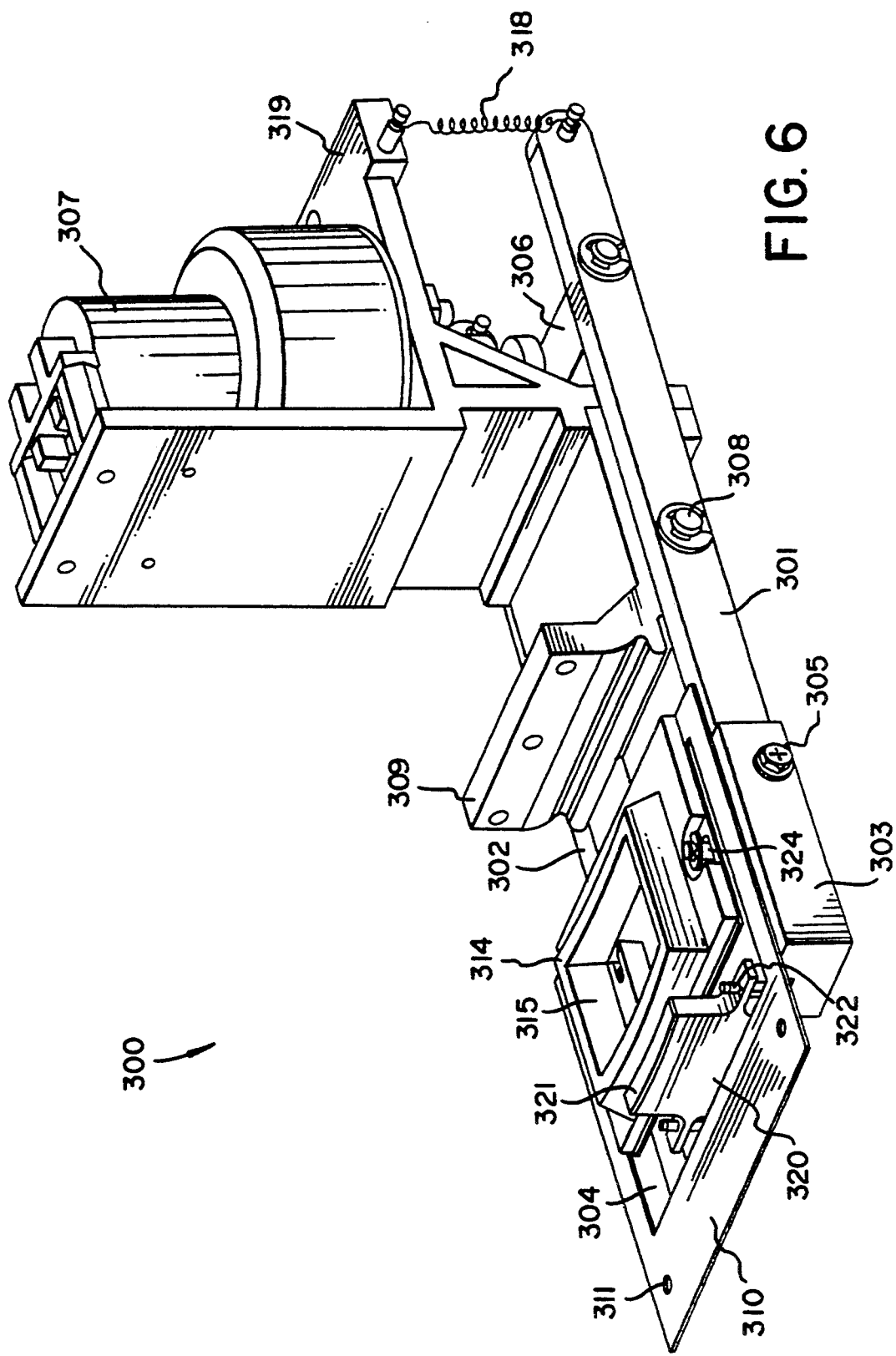
FIG. 6 is a perspective view of the double-arm embodiment of the clamping apparatus of the present invention used with the gate of FIG. 5.
Figure 7:
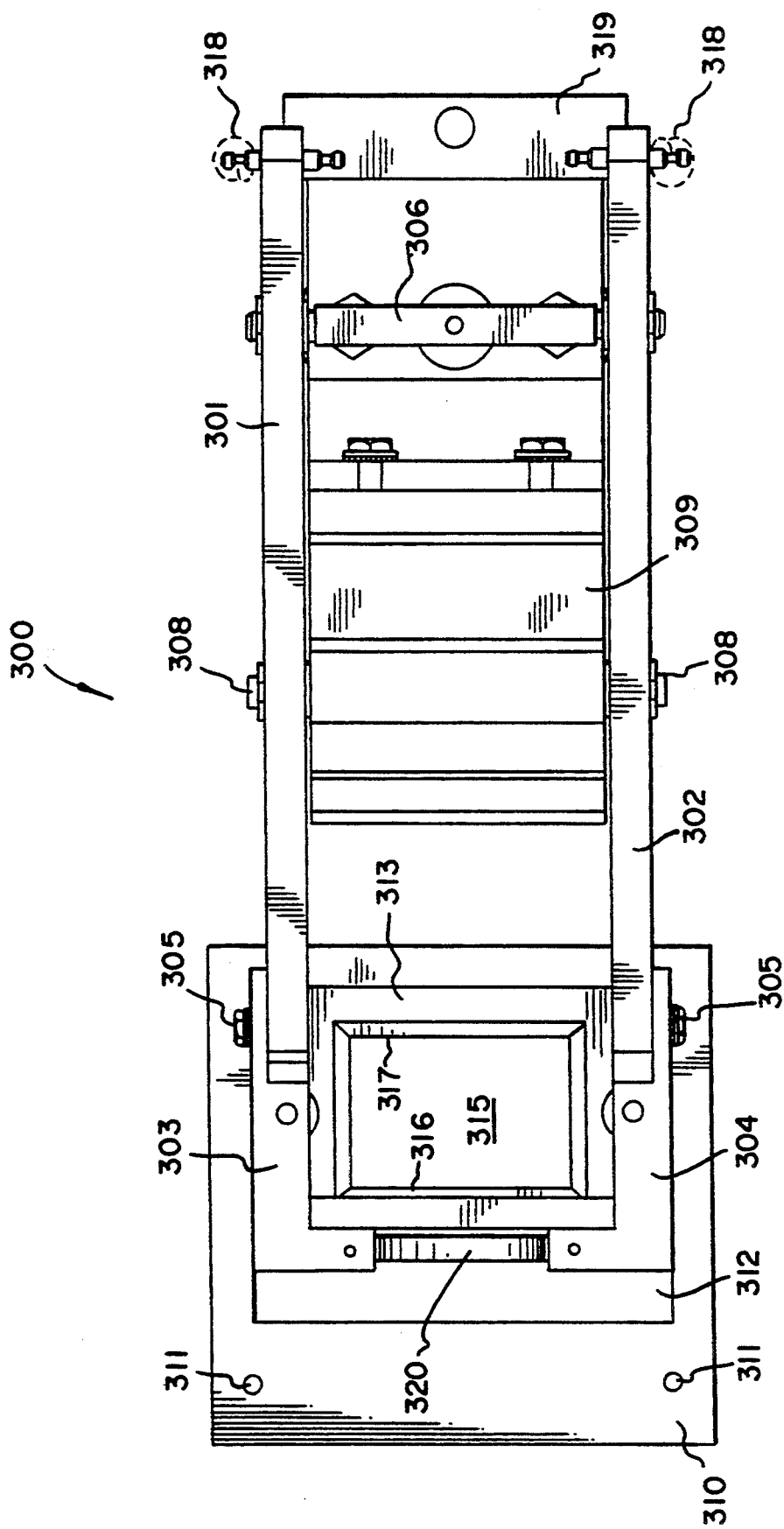
FIG. 7 is a bottom plane view of the clamping apparatus shown in FIG. 6.
Figure 8:
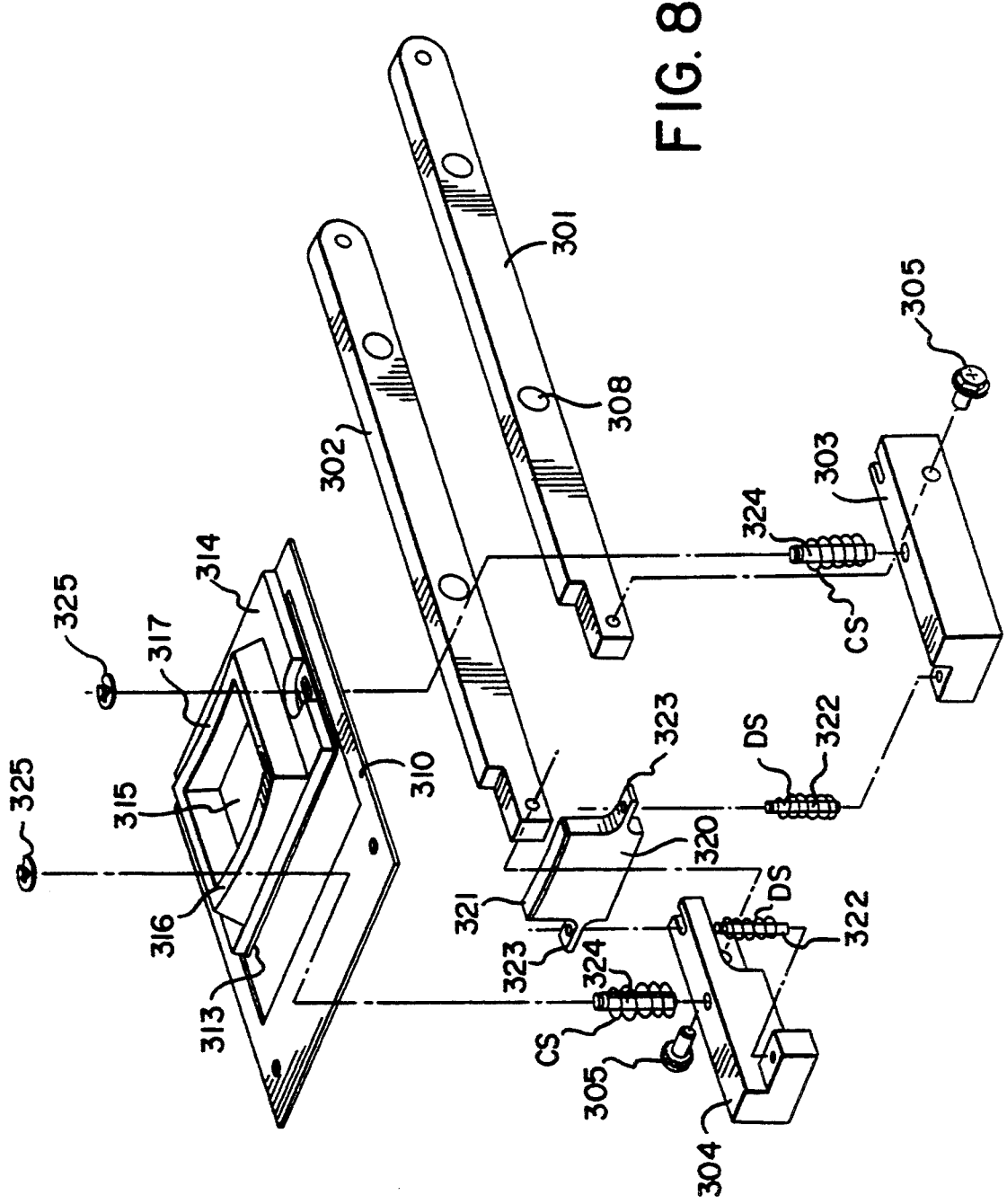
FIG. 8 is an exploded view of the parts of the clamping assembly shown in FIGS. 6 and 7.
Figure 9:
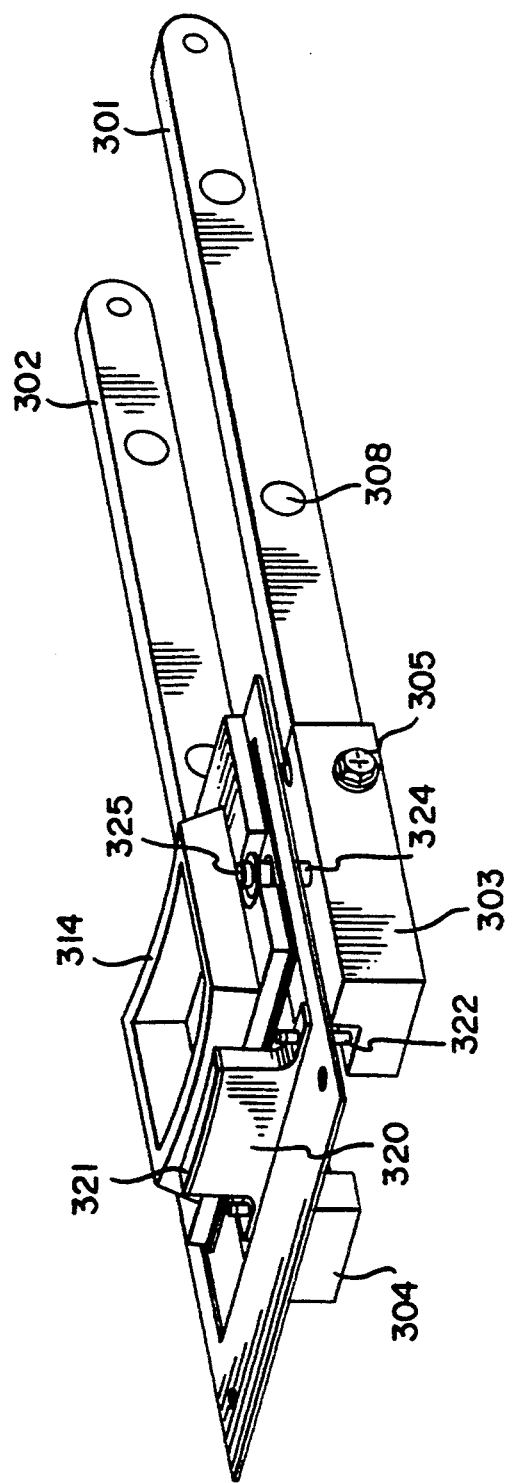
FIG. 9 is a view of the double-arm clamping apparatus similar to that shown in FIG. 6 but with certain components such as the pivot block and solenoid mounting block removed.
Figure 11:
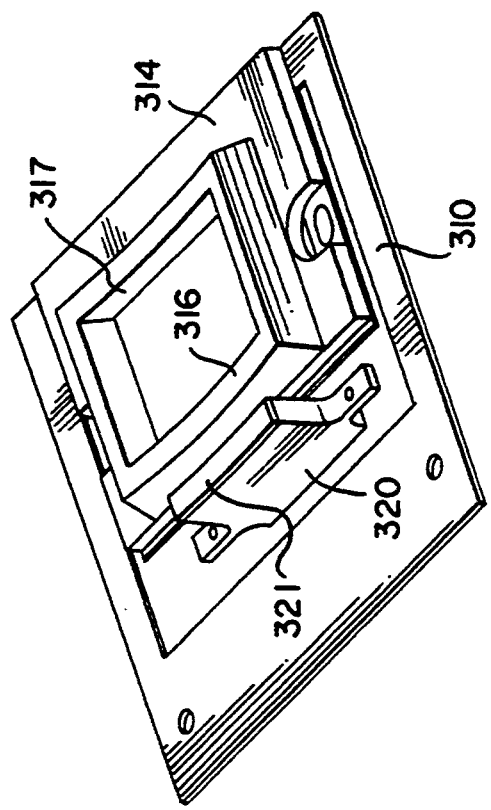
FIG. 11 is a top perspective isolated view of the clamp pad and the flexure shown exploded from the other clamp components in FIG. 8.
Figure 10:
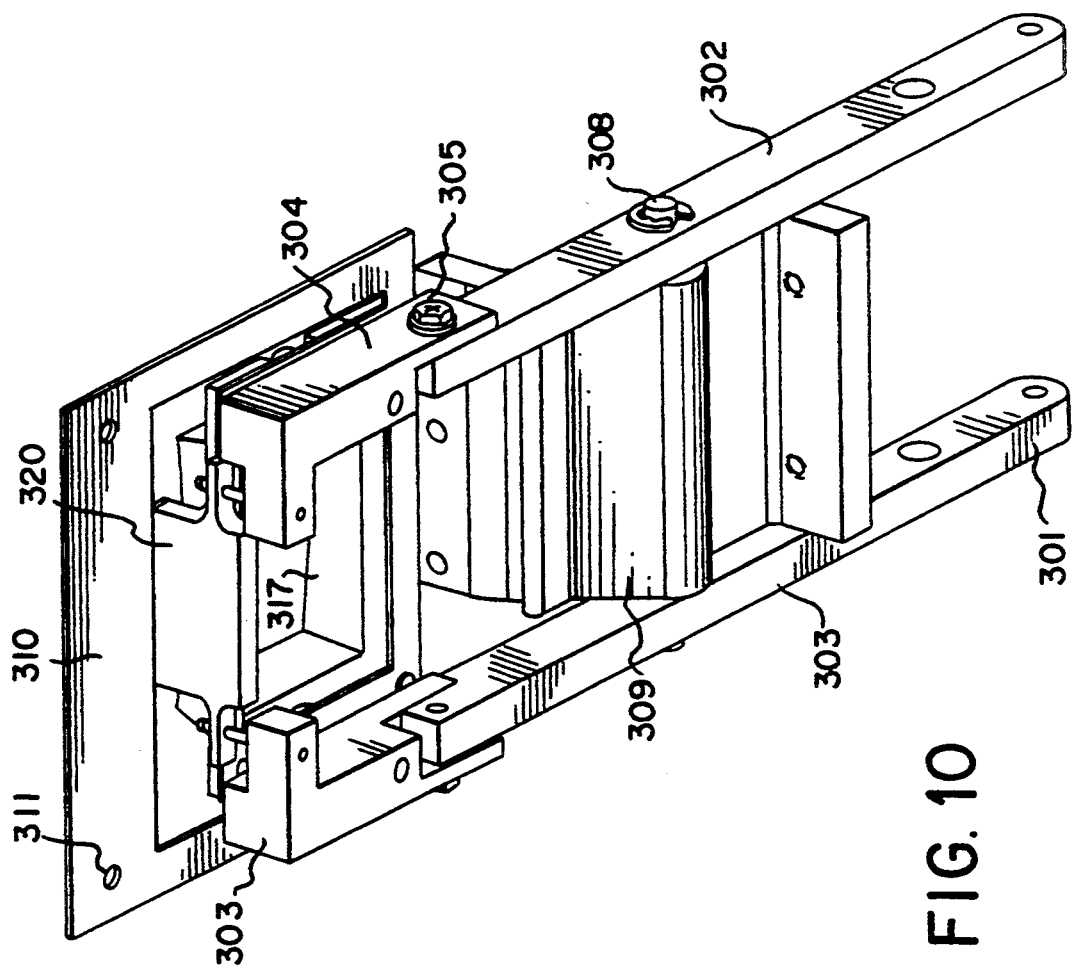
FIG. 10 is a bottom perspective view of the clamping apparatus shown in FIG. 6.
Figure 11A:
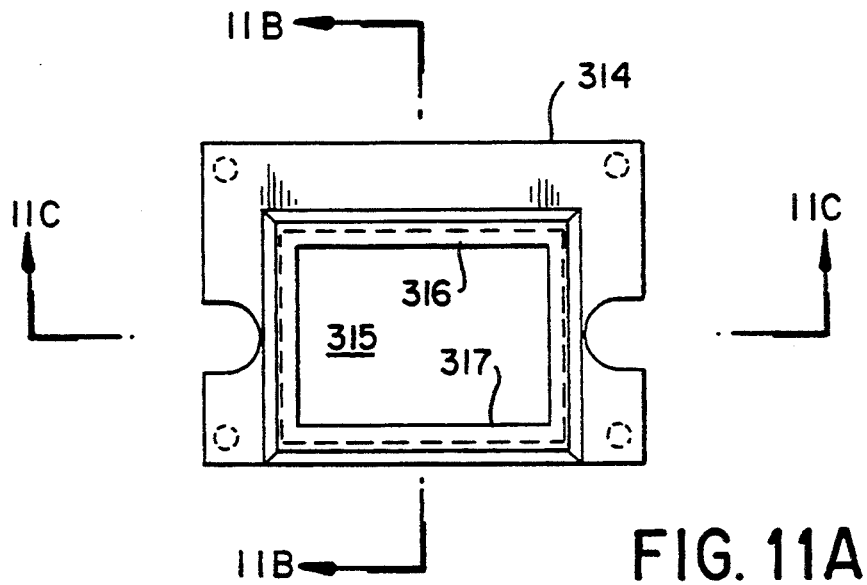
FIG. 11A is an isolated top plan view of the resilient clamping pad shown in FIG. 11.

One embodiment of the clamping mechanism as shown in FIGS. 6 through 11 uses two clamp lever arms 301, 302 of identical construction. Pin blocks 303, 304, also of identical but mirror-image construction, are provided at respective free ends of the clamp lever arms 301, 302 and are joined thereto in a conventional manner by screws 305 or the like. A bridging member 306 joins the arms 301, 302 near their other free end so as to be actuated by a solenoid 307 (shown in FIG. 6) in a manner hereinafter described with reference to FIG. 20. The arms 301, 302 pivot together around an axis defined by a pivot bolt 308 in a pivot block 309 held fixed to the gate 100 through the pivot block by conventional screws, bolts or the like (not shown). A flexure member 310 (shown in FIG. 11D) having mounting apertures 311 for attachment to the gate 100 is made of a resilient and flexible thin material such as 0.018 inch stainless steel. The flexure member 310 is substantially rectangular in shape, as best seen in FIGS. 7 and 8, but has a hollowed-out central portion 312 (shown in FIG. 7) except for a portion 313 which extends from the rearward end toward the center of the flexure member opening 312 so as to define a surface for carrying a resilient clamp pad 314 (shown in FIGS. 8, 9 and 11A) which can be molded thereon and provide a gimballing effect to compensate for any mismatch between the upper surface of the clamp pad 314 and the lower surface 102 (shown in FIG. 5) of the gate 100 against which the clamp pad 314 bears. In addition, a portion of the clamp pad 314 comes into contact with the surface 102 before the full travel of the solenoid 307 has been completed. At this time, the flexure member 310 is flat. Referring to FIG. 8, compression springs CS located between the bottom of the portion 313 and the top of the pin blocks 303, 304, are compressed to provide additional clamping force to the resilient clamp pad 314 as the solenoid 307 travels to the end of its driving position.

Figure 13:
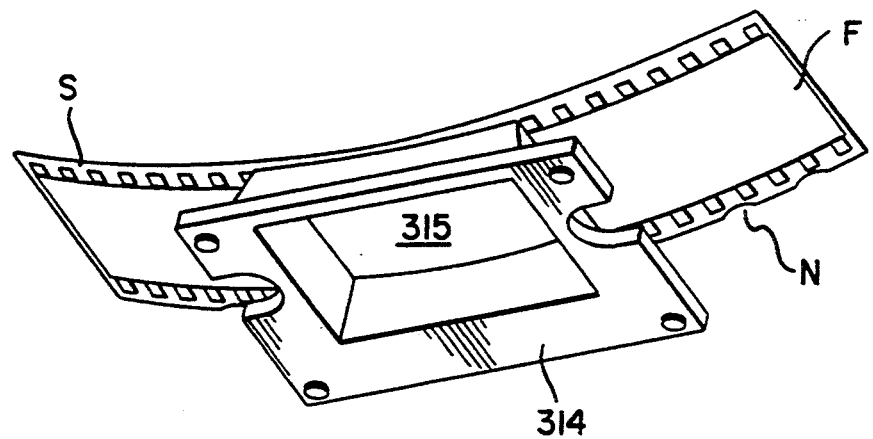
FIG. 13 is an isolated perspective view of the clamp pad of FIG. 11 clamping a notched strip of film which does not have laminated paper on an edge thereof.

The clamp pad 314 is made of a resilient, conformable material such as urethane (e.g. 90 durometer) so as to clamp the film F against the surface 102 of the gate 100 and to pull the film against the spring biased tension rollers as the gate 100 travels. It will be appreciated by those skilled in the art that the aperture 315 defined by the clamp pad 314 will be so sized as to match the area of the aperture 103 in the gate 100 and will thus clamp relevant frame of the film F around its entire periphery as shown in FIG. 13 (which also shows the notches N for locating the scannable images in a known manner) and not only at the edges containing the film sprockets S. This arrangement provides a much more secure clamping of the film F at the gate 100, and thus also assures that the film F will remain in the exact position desired for high resolution digitization of the image.

The annular upper surface of the clamp pad 314 is also matched to the 6 inch radius of the lower surface 102 of the gate 100. To this end, the forward and rearward top surfaces 316, 317 of the clamp pad 314 (see FIGS. 11A, 11B and 11C) are arcuate in shape and have the same radius of curvature as the lower surface 102 of the gate 100. As a result, this clamp mechanism 300 avoids the misalignment that might otherwise occur as was the case with previous scanning apparatus and assures that the film follows the plane of the gate which results in a virtually perfectly flat scanning line across the aperture 103 of the gate 100.

Figure 12:
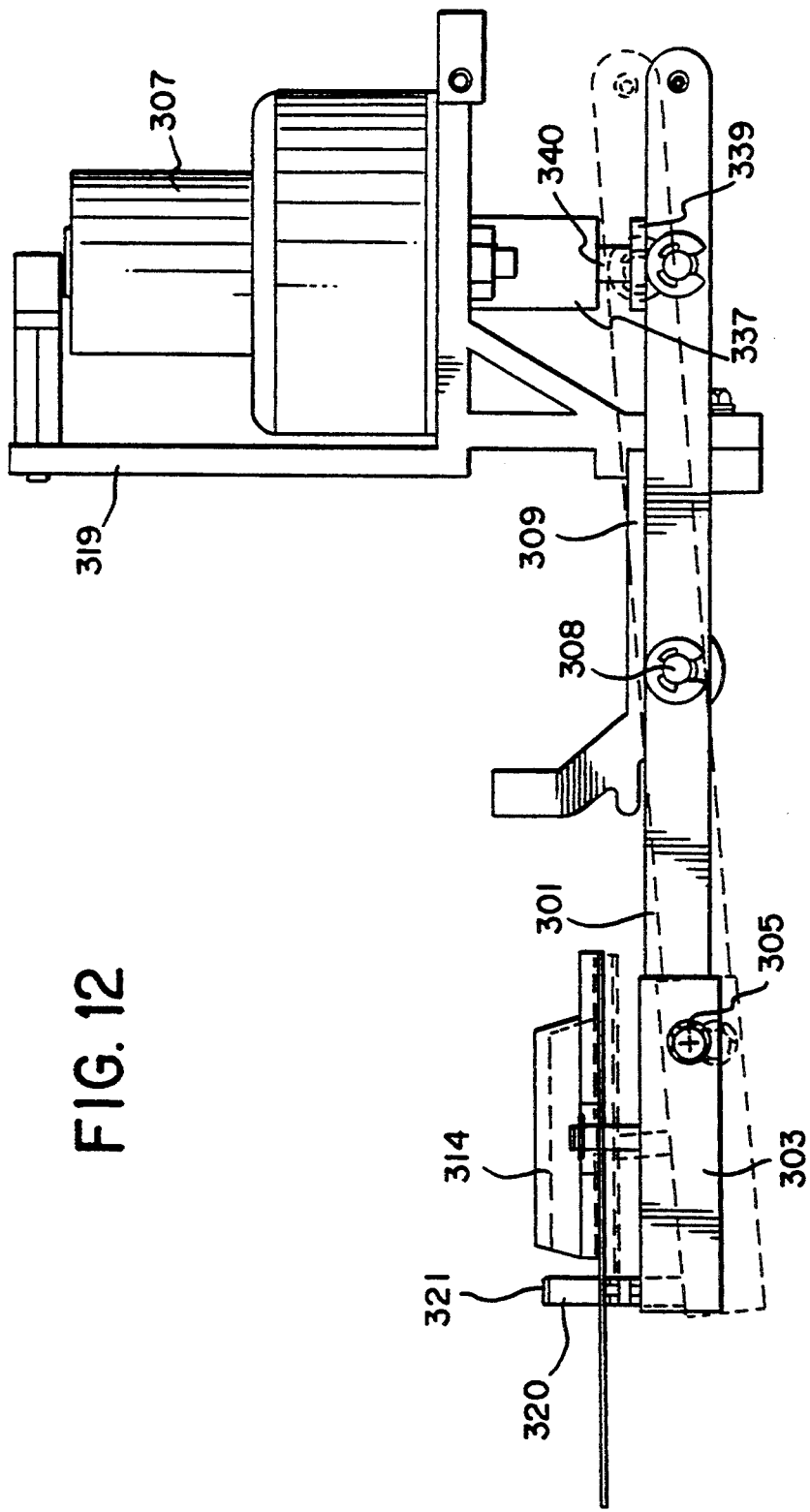
FIG. 12 is a side view of the double-arm clamping mechanism shown in FIG. 6 with the unclamping position shown in dashed lines.

When the solenoid 307 is not actuated, i.e. between scanning cycles when the film F is being advanced to the desired frame over the aperture 103 of the gate, the clamping mechanism 300 is biased towards its unclamped position shown in short dash lines in FIG. 12, as previously noted, by virtue of tension springs 318 (only one of which is shown in FIG. 6) connected between the free end of each of the arms 301, 302 and a solenoid mounting block 319 upon which the solenoid 307 is mounted and fastened to the gate 100 for movement therewith in the previously described pendulum-like manner.

Figure 11B:
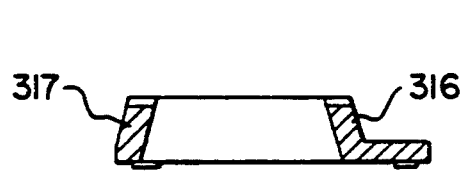
FIG. 11B is a cross-sectional view along line 11B—11B of FIG. 11A.
Figure 11C:
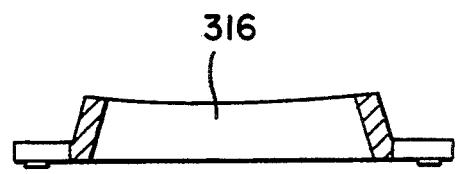
FIG. 11C is a cross-sectional view along line 11C—11C of FIG. 11A.
Figure 11D:
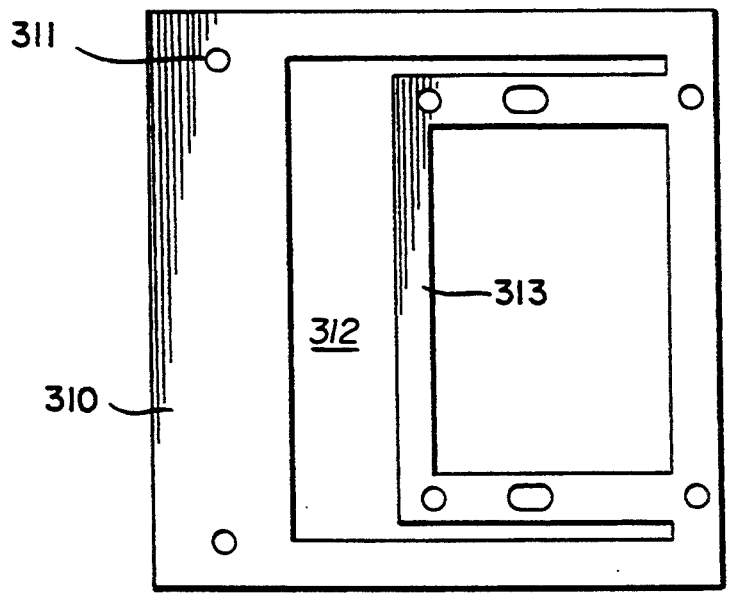
FIG. 11D is an isolated top plan view of the flexure member upon to which the clamping pad of FIGS. 11A-C is molded.

As seen in FIGS. 11B and 11C, the four walls of the clamp pad 314 diverge outwardly towards the flexure member 310 so as to form a light baffle, thereby preventing any light from being reflected from these clamp pad walls from the light source of the integrating cavity 15 above to the imager unit 16 below and thus produce a markedly clearer image for digitization.

Another unique feature of the clamping mechanism 300 constituting the present invention, as noted above, is its ability to allow the use of film F alone (first orders) or film and paper laminate L having punched apertures P of different configurations (FIG. 14) such as the Kodak system and the URS system (reorders), on reels so that a large supply of film can be processed at one time in several different formats without the need to change any parts of the scanning apparatus 10. An advantageous way of providing this flexibility is through the provision of an additional clamp pad 320 having a laminate rubber or other resilient material strip 321 on its upper surface also configured to the arcuate shape of the lower surface 102 gate 100. The additional clamp pad 320 is resiliently held to the pin blocks 303, 304 through pins 322 projecting upwardly from a base portion of the pin blocks 303, 304 which are L-shaped as seen in FIG. 8. The pins 322 project through apertures in integral projecting members 323 extending laterally from each side of the clamp pad 320 and are held securely thereon by conventional circlips 325. Compression coil springs (CS) can be provided on the pins 322 between the projections 323 and the base of the pin blocks 303, 304 so as to normally bias the clamp pad 320 upwardly away from the pin blocks 303, 304 and accommodate any dimensional variations or mismatches.

Figure 14:
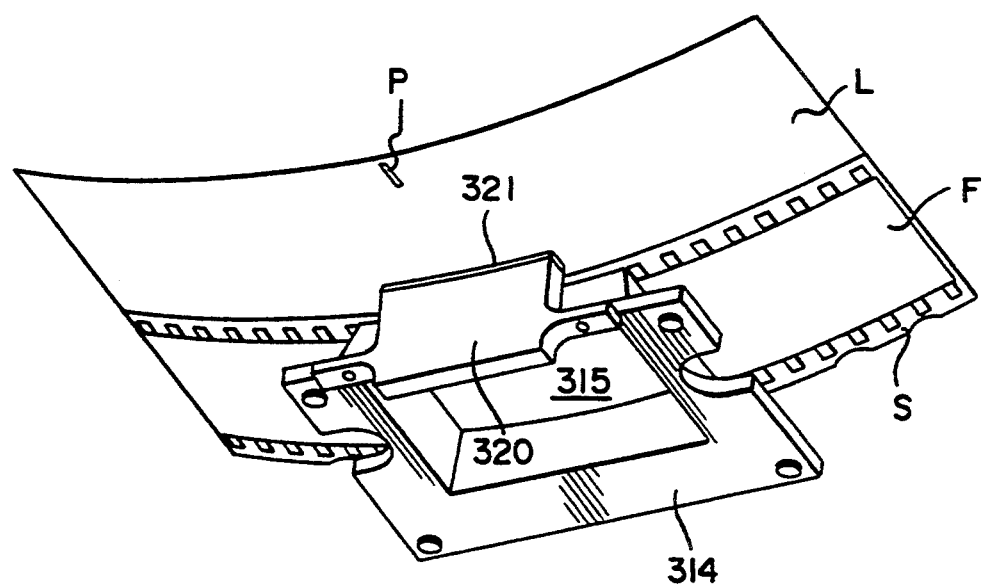

In operation, when the solenoid 307 is actuated to close the clamp (the solid line position in FIG. 12) when the gate 100 has been moved to either the right side or the left side and the appropriate frame of film F is located over the aperture 103 of the gate 100, the pads 314, 320 are so configured and arranged such that the pad 314 first engages the perimeter of the film frame around the aperture 103 of the gate 100 and then the additional clamp pad 320 comes into contact with the paper laminate L to the final clamping position as shown in FIG. 14. The sequential engagement of first the clamp pad 314 and then the clamp pad 320 shortly thereafter avoids any tolerance problems that may exist between the parts and avoids under any circumstances clamping the laminate L first. Otherwise, if the laminate L were clamped first, the image on the frame of film F to be scanned may not be registered properly with the aperture. When both the film F and laminate L are clamped by the respective clamps 314, 320, there is essentially the same amount of clamping force on both, about two pounds. Stated somewhat differently, the additional clamp 320 imitates the wall of the clamp pad 314 so as to prevent any relative motion between the film F and the laminate L.

Thus, the laminate L allows film to be put on the supply reel 12 and provides greater versatility for the scanning apparatus. The two clamp pads 314, 320 avoid any mismatches which may occur between the tension on the film and on the laminate and thereby avoid the laminate L from being torn away from the film F. Moreover, since there is web tension on only the laminate during movement of the gate 100, potential snagging is avoided. The initial clamping of the film first before the laminate assures the operator that the film lays in the desired contour of the gate 100.

The configuration of the flexure member 310 provides, as previously noted, gimballing of the clamp pad 314 through pins 324 held mounted in the pin blocks 303, 304 so as to pass through the portion 313 of the flexure member 310. Again, conventional circlips 325, similar to those used in the pins 322 are provided on the pins 324 to prevent the flexure member 310 from being separated from the pins while, at the same time, allowing axial movement along the pins 324 for gimballing. In the event that there is any misalignment between, for example, the arms 301, 302, the pins 324 with compression springs CS on each of the arms 301, 302 provide the additional clamping force and also the necessary gimballing which allows the application of equal force around the entire periphery on the upper edges of the clamp pad 314 in contact with the film F. Similarly, the pins 322 and compression springs DS between projecting members 323 and the pin blocks 303, 304 associated with the additional clamp pad 320 also provide the additional clamping force for the laminate and the gimballing in the event of misalignment so that equal force is applied to the laminate L across the entire strip. Such an arrangement provides for maximum uniform tension along and between the film F and the laminate L.

Figure 15:
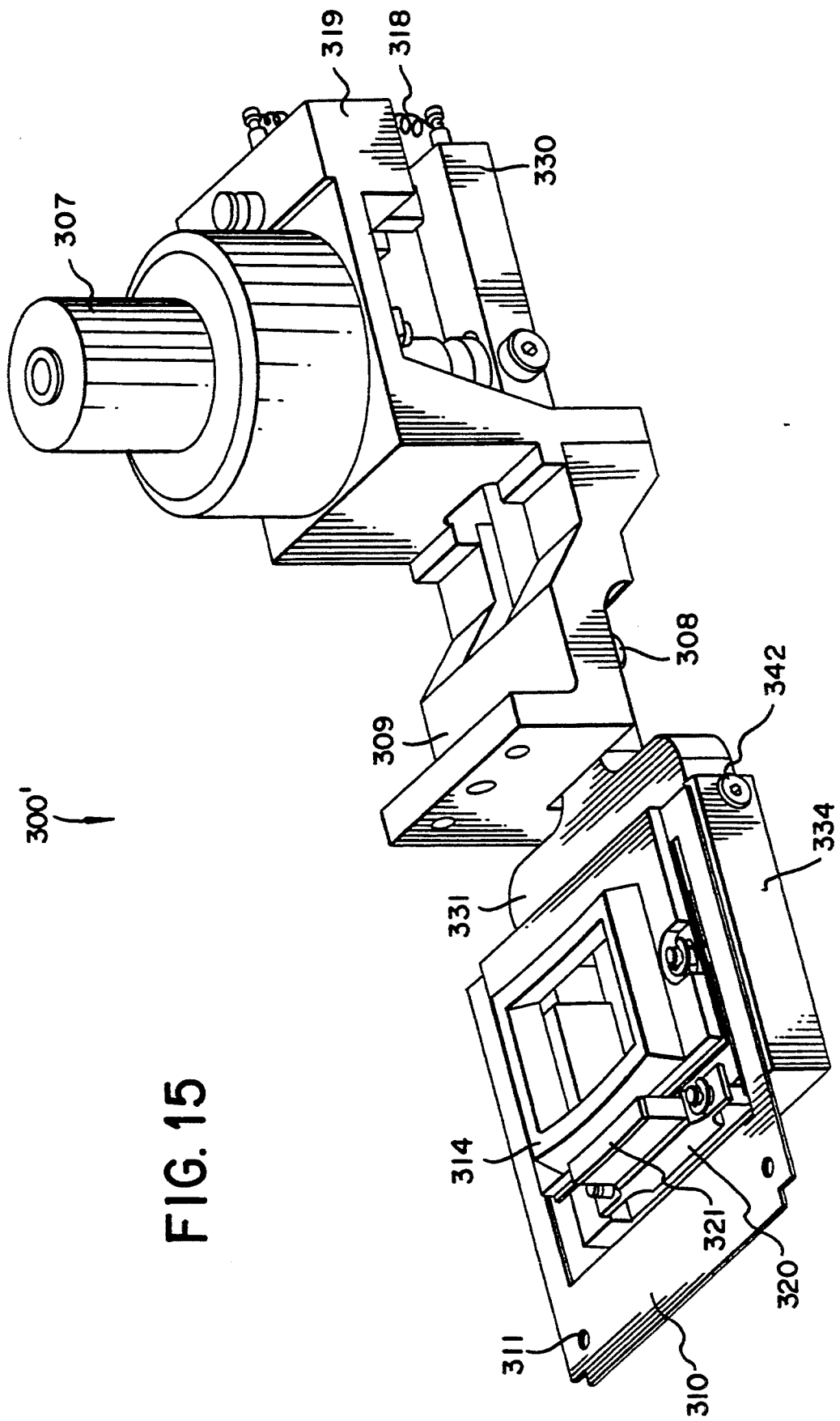
FIG. 15 is a perspective view similar to FIG. 6 but showing the Y-shaped single arm embodiment of the clamping mechanism.
Figure 16:
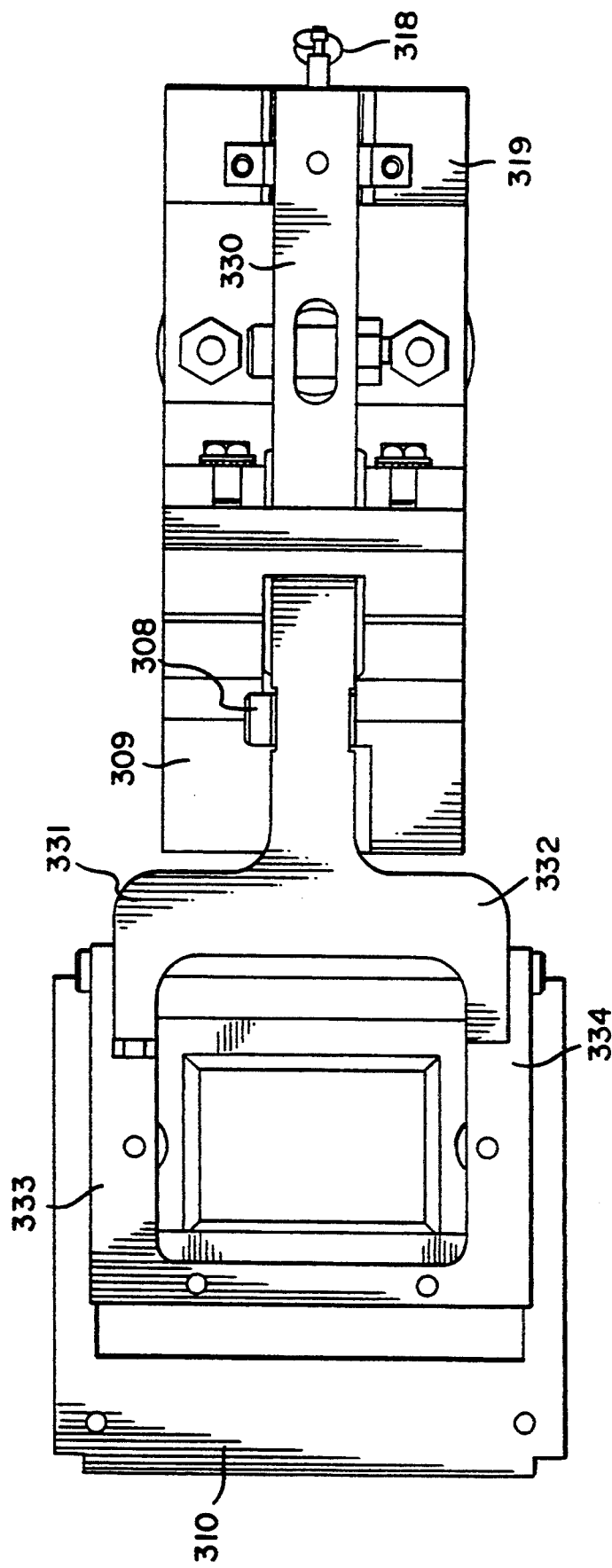
FIG. 16 is a bottom plane view of the clamping mechanism shown in FIG. 15.
Figure 17:
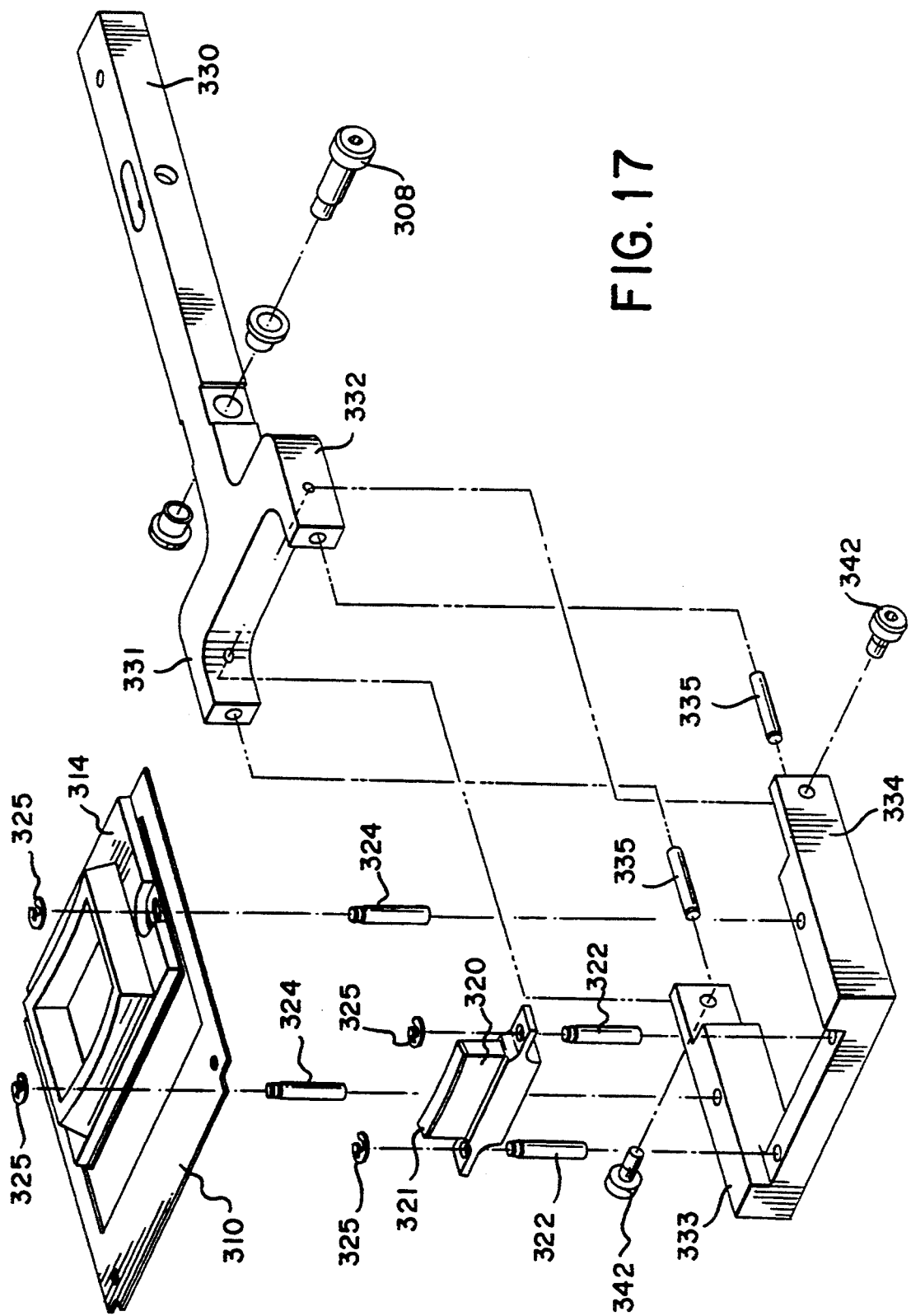
FIG. 17 is an exploded perspective view of the parts of the clamping mechanism shown in FIGS. 15 and 16.
Figure 18:
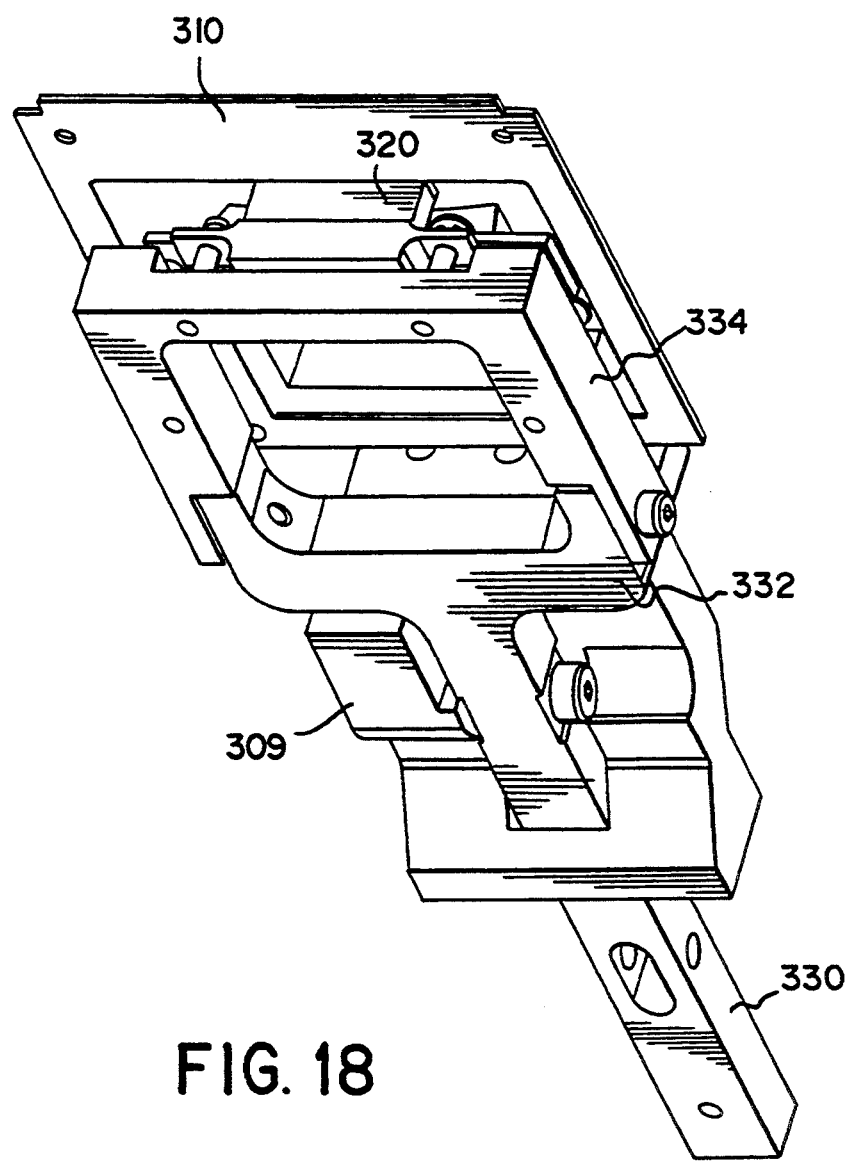
FIG. 18 is a bottom perspective view of the Y-shaped single arm clamping mechanism of FIG. 15.
Figure 19:
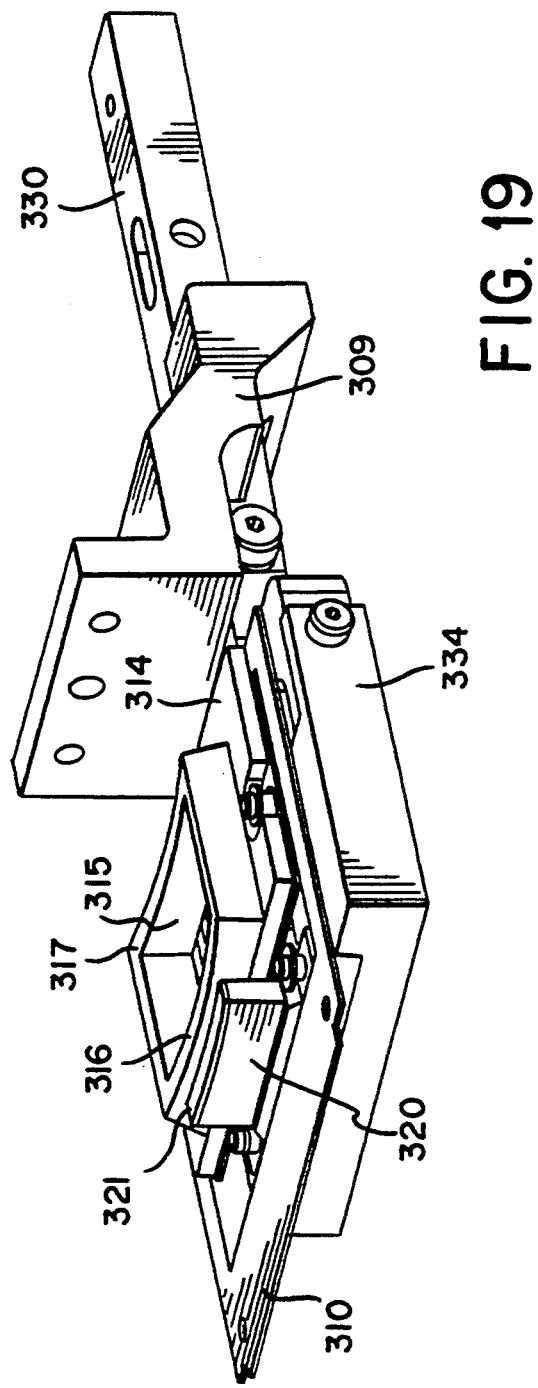
FIG. 19 is a perspective view of the clamping mechanism shown in FIG. 15 but with the solenoid mounting block and the solenoid not shown.

According to another embodiment of the clamping mechanism of the present invention designated generally by numeral 300′ in FIGS. 15 through 19, the double arms 301, 302 are replaced by a single arm member 330 having a roughly Y-shape whose forked ends 331, 332 are attached to a U-shaped pin block having legs 333, 334, as best seen in FIGS. 16 and 17, through horizontal pins 335 to support a flexure member 310 and clamp pad 314 molded thereon in essentially the same manner as described with reference to the embodiment of FIGS. 6 through 14, including the additional clamp pad 320 and strip 321. Hence, a description of those parts can be dispensed with here except to note the following.

Only one pin block having a U-shaped form is attached to the forks 331, 332 of the single clamp lever arm 330. The pins 322 for the additional clamp pad 320 are mounted in the bight portion of the pin block. The clamping mechanism 300′ shown in FIG. 15 pivots with respect to a somewhat differently shaped pivot block 309 held at the gate 100 through a pivot joint 308 between the pivot block 309 and the clamp lever arm 330. The pivot block 309 is also joined with the solenoid mounting block 319 in a manner similar to that of the clamp mechanism of FIG. 6. The pin block is accurately aligned with the forks of the clamp lever arm by the horizontally arranged pins 335 between the pin block legs 333, 334 and the respective forks 331, 332.

Figure 20:
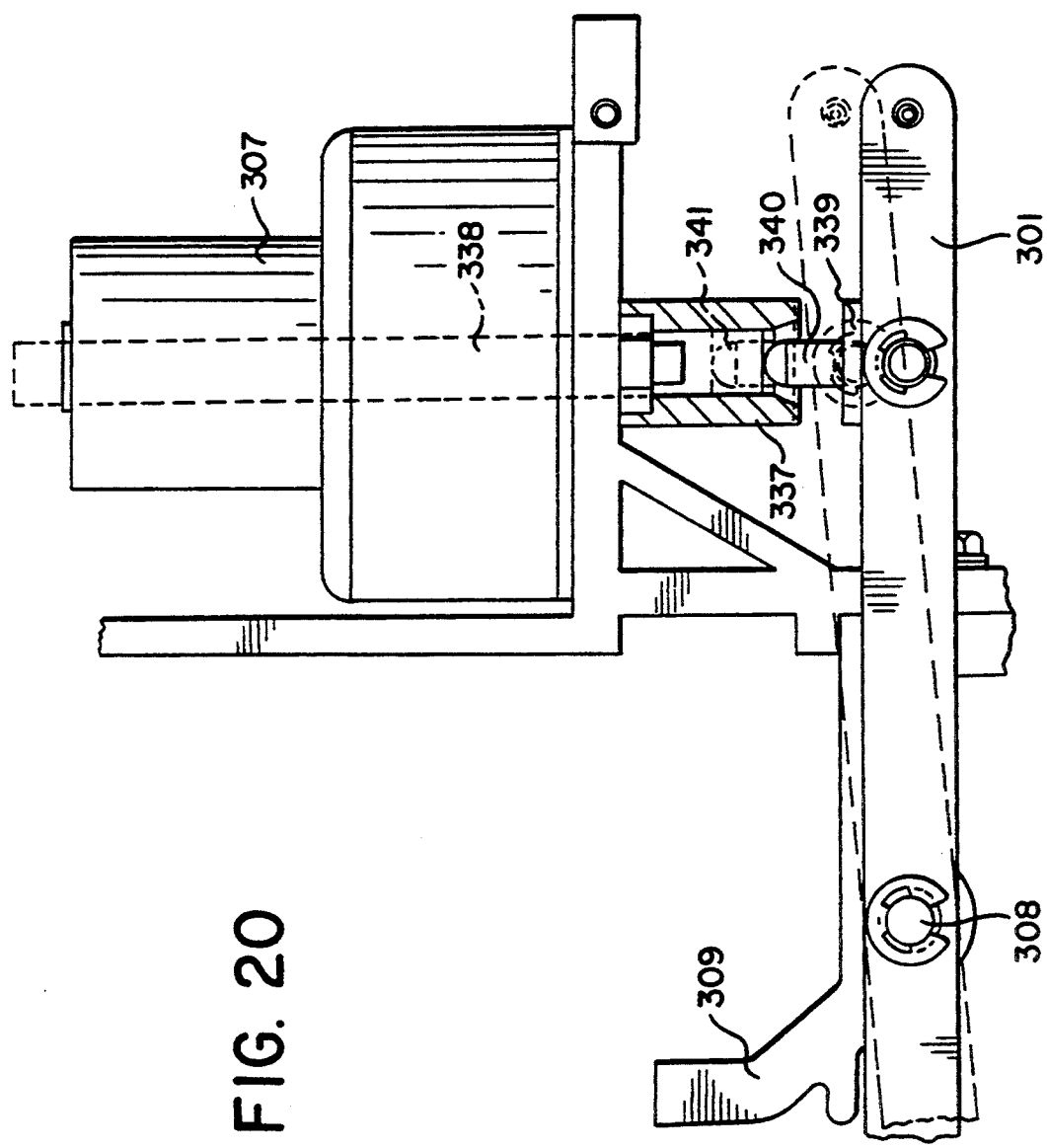
FIG. 20 is a partial side elevational view of a solenoid driving mechanism which prevents side loads on the solenoid shaft and which can be used for the double-arm embodiment and the single-arm embodiment of the present invention as shown in FIGS. 6 and 15, respectively.

Although FIG. 20 shows the operation of the solenoid 307 with respect to the embodiment of FIG. 6, it will be appreciated by one of ordinary skill in the art that the same actuating system is essentially applicable to the embodiment of FIG. 15 with readily determinable minor modifications. An actuator guide 337 is provided at the end of the solenoid 307 through which the solenoid shaft 338 reciprocates upon the application of electrical energy thereto. A solenoid stop 339 is mounted on the rotatable cross member 306 and has a shaft actuator 340 projecting upwardly therefrom with a hemispherical end portion 341 in contact with the end of the shaft 338 of the solenoid 307. It can be seen that in moving between the solid line clamping position and the short dash line unclamping position in FIG. 20, the shaft actuator 340 always maintains a substantially point contact with the shaft 338 of the solenoid 307 to avoid any undesirable side loads on the solenoid shaft 338.

The clamping mechanisms 330, 330′ are also gimballed because the clamp pad 314 rotates about the axis 308, and the front wall 316 and rear wall 317 do not contact the film F at the same time. Conversely, the mechanism pulls down more in the front than in the back during unclamping and therefore needs gimballing for adjustment as it rotates upwardly into the clamping position. The Y-shape single clamp lever arm of mechanism 300′ is much simpler in construction than the embodiment of FIG. 6 and does not have as much undesired flexure and thus distortion as with the two arm embodiment which must be gimballed because the two arms are driven in the middle and thus provides a moment arm offset which must be compensated for.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A photographic film scanning apparatus, comprising a movable gate with an arcuate surface having an aperture therethrough and a clamping device movable with the gate, wherein the clamping device has at least one arm pivotally mounted at the gate, an actuator operatively associated with the at least one arm for pivoting the latter between a clamped position and an unclamped position, a flexure member carried at a first end of the at least one arm, and a resilient clamping pad mounted on the flexure member, wherein the resilient clamping pad has an upper surface sized to match a perimetrical region of the gate aperture and configured to match the arcuate surface of the gate so as to securely clamp an image on a photographic film between the clamping device and the gate and to maintain the film in a flat plane in a scanning direction.

2. The scanning apparatus according to claim 1, wherein a second clamping pad is provided at the first end of the at least one arm independently of the flexure member so as to securely clamp a laminate attached to the photographic film.

3. The scanning apparatus according to claim 2, wherein the second clamping pad is configured such that the first-mentioned clamping pad contacts the photographic film in advance of clamping of the laminate by the second clamping pad.

4. The scanning apparatus according to claim 1, wherein biasing apparatus operatively arranged between the flexure member and the at least one arm is configured so as to provide an additional clamping force on the resilient clamping member as the actuator assumes a final driving position.

5. The scanning apparatus according to claim 1, wherein the actuator is an electrically operated solenoid operatively associated near a second free end of the at least one arm.

6. The scanning apparatus according to claim 1, wherein the at least one arm consists of two arms.

7. The scanning apparatus according to claim 6, wherein a cross member connects the two arms at a second free end of the arms, and means is associated with the cross-member for preventing side loads on the actuator.

8. The scanning apparatus according to claim 7, wherein the actuator is a solenoid with a shaft, and said means includes a shaft actuator with a hemispherical portion in point contact with the solenoid shaft.

9. The scanning apparatus according to claim 1, wherein the resilient clamping pad has side walls which diverge in a direction away from the gate so as to minimize reflection of light from the side walls.

10. The scanning apparatus according to claim 9, wherein a second clamping pad is provided at the end of the at least one arm independently of the flexure member so as to securely clamp a laminate attached to the photographic film.

11. The scanning apparatus according to claim 10, wherein the second clamping pad is so configured that the first-mentioned clamping pad contacts the photographic film in advance of clamping of the laminate by the second clamping pad.

12. The scanning apparatus according to claim 11, wherein biasing apparatus operatively arranged between the flexure member and the at least one arm is configured so as to provide an additional clamping force on the resilient clamping member as the actuator assumes a final driving position.

13. The scanning apparatus according to claim 12, wherein the actuator is an electrically-operated solenoid operatively associated at another end of the at least one arm.

14. The scanning apparatus according to claim 1, wherein the at least one arm consists of a Y-shaped arm with the flexure member mounted at the first end in the form of two branches of the Y-shape.

15. A clamping device comprising at least one arm adapted to be pivotally mounted, a flexure member at a first end of at least one arm, a resilient clamping pad mounted on the flexure member, an actuator operatively associated with the arm for selectively moving the resilient clamping pad between a first unclamped position and a second clamped position, the resilient clamping pad being configured with non-parallel side walls, and upper surfaces of two opposed side walls having a predetermined arcuate configuration; and wherein a second clamping pad is provided at the end of the arm independently of the flexure member.

16. The clamping device according to claim 15, wherein the second clamping pad is so configured that the first-mentioned clamping pad contacts a surface to be clamped in advance of clamping of another surface by the second clamping pad.

17. A method for clamping at least one of a photographic film and a laminate attached to photographic film in a scanning apparatus, comprising the steps of moving a gate with an arcuate surface to a first position where an aperture on the gate is ready to proceed with a line-by-line scanning process;

moving an image on the photographic film to the aperture on the gate;

actuating a clamping device having a complementary arcuate surface on a resilient pad fixed on the gate so as to move the pad from a first unclamped position to a second clamped position wherein the arcuate surface of the pad mates with the arcuate surface of the gate around the perimeter of the aperture; and providing an additional clamping force on the pad via biasing apparatus on the clamping device.

18. The method according to claim 17, wherein a second clamping pad is brought from a first unclamped position to a second clamped position to clamp the laminate subsequent to clamping of the photographic film.

19. A clamping device comprising at least one arm adapted to be pivotally mounted, a flexure member at a first end of at least one arm, a resilient clamping pad mounted on the flexure member, an actuator operatively associated with the arm for selectively moving the resilient clamping pad between a first unclamped position and a second clamped position, the resilient clamping pad being configured with non-parallel side walls, and upper surfaces of two opposed side walls having a predetermined arcuate configuration; and biasing apparatus operatively arranged between the flexure member and the arm and configured so as to provide an additional clamping force on the resilient clamping member as the actuator assumes a final driving position.

20. A clamping device comprising at least one arm adapted to be pivotally mounted, a flexure member at a first end of at least one arm, a resilient clamping pad mounted on the flexure member, an actuator including an electrically-operated solenoid operatively associated with another end of the arm for selectively moving the resilient clamping pad between a first unclamped position and a second clamped position, the resilient clamping pad being configured with non-parallel side walls, and upper surfaces of two opposed side walls having a predetermined arcuate configuration.

* * * * *